United States Patent

[11] 3,545,485

[72] Inventor Robert O. Clark
    Albuquerque, New Mexico
[21] Appl. No. 794,965
[22] Filed Jan. 29, 1969
[45] Patented Dec. 8, 1970
[73] Assignee The United States of America, as
    represented by the Secretary of the Air
    Force

[54] GAS PARTITIONING PRESSURE REGULATOR
    1 Claim, 1 Drawing Fig.
[52] U.S. Cl. .................................................. 137/508
[51] Int. Cl. ............................................ F16k 31/363
[50] Field of Search ........................................ 137/503,
    505.18, 505.25, 508; 251/368

[56] References Cited
UNITED STATES PATENTS
614,441 11/1898 Burnett ..................... 137/505.25
1,406,012 2/1922 Hinchman ................. 137/505.25X
2,839,078 6/1958 Lornitzo ..................... 137/508
2,938,704 5/1960 Quail .......................... 251/368X
3,196,901 7/1965 Phillipps ..................... 137/505.25X FOREIGN PATENTS
417,160 1/1923 Germany .................... 137/508
969,901 9/1964 Great Britain .............. 137/508

Primary Examiner—M. Cary Nelson
Assistant Examiner—R. B. Rothman
Attorneys—Harry A. Herbert, Jr. and James S. Shannon ABSTRACT: A gas partitioning regulator which allows a predetermined fraction of applied pressure to be passed. The regulator utilizes a piston having two ends of differing areas and a connecting orifice between them. Two chambers are formed, one adjacent to each end of the piston, and the fraction of pressure which will be passed from the first chamber to the second chamber depends upon the areas selected for the piston ends and for the connecting orifice.

PATENTED DEC 8 1970
3,545,485
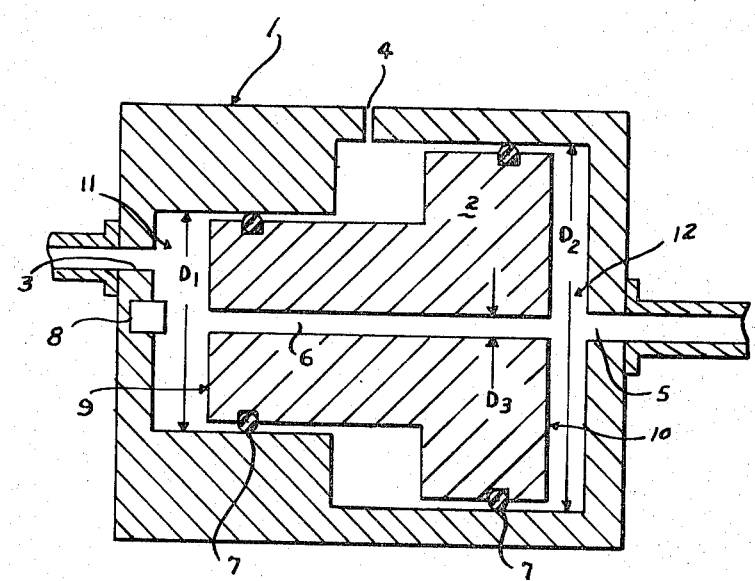
INVENTOR.
ROBERT O. CLARK
BY Harry A. Herbert Jr.
ATTORNEY

GAS PARTITIONING PRESSURE REGULATOR

BACKGROUND OF THE INVENTION

This invention is in the field of pressure regulators particularly those that reduce the pressure by a constant factor.

SUMMARY OF THE INVENTION

This invention utilizes a piston which is allowed to move back and forth under pressure within a cylinder. The piston has ends of unequal area and a connecting passageway cut through its center. The cylinder has an inlet orifice, an outlet orifice, a bleed orifice, and a Teflon plug in the wall of the inlet end. When the piston is in a throttled position the connecting orifice rests against the Teflon plug and no gas is allowed to pass through the connecting orifice. As pressure is applied the piston moves away from the Teflon plug and part of the pressure is transferred from a first chamber at one end of the piston to a second chamber at the other end. Pressure continues to pass until the piston is in equilibrium or, in other words, until the gas in the second chamber exerts an amount of pressure on the second end of the piston equal to that being exerted on the first end by gas in the first chamber. Then, as pressure in the second chamber continues to build up, the piston moves back toward a throttling position until the Teflon plug finally chokes off the connecting orifice.

BRIEF DESCRIPTION OF THE DRAWING

The single FIG. is a cross section of the regulator of this invention.

DESCRIPTION OF THE PREFERRED EMBODIMENT

A complete understanding of this invention may be had by referring to the drawing. The drawing shows a cylinder 1 having within it a piston 2. The cylinder has an inlet orifice 3, a bleed orifice 4, and an outlet orifice 5. The piston has a connecting passageway 6 drilled through it and is fitted with two O-rings 7 which serve to keep applied pressure passing through the connecting passageway 6 rather than around the outer edges of the piston. Bleed orifice 4 is simply to allow any pressure seeping past O-ring 7 to escape. The inlet end of the cylinder has a Teflon plug 1 plug 8 placed in a position such that when the piston 2 moves against it, the plug 8 will choke off the orifice of passageway 6 and thus not allow pressure to pass through the piston 2.

When gas from a source not shown passes in, through inlet orifice 3, pressure builds up against the inlet end 9 of the piston 2. As pressure continues to build up, the piston 2 moves away from plug 8 forming chamber 11 and some of the pressure passes into chamber 12 via connecting passageway 6. The piston continues to move away from plug 8 until equilibrium is reached. Equilibrium is reached when the amount of force pressing on end 10 of piston 2 equals the amount of force pressing on end 9 of piston 2.

Now it can readily be seen that since end 9 of piston 2 a smaller area than end 10 of piston 2, only part of the pressure originally applied to end 9 through orifice 3 and chamber 11 needs to be transmitted through passageway 6 to chamber 12 in order for equilibrium to be reached. When equilibrium is reached depends upon the relative areas of end 9, a end 10, and connecting passageway 6. For example, one could build a piston that would be at equilibrium when the pressure in chamber 12 was one-half of that in chamber 11 by properly varying the areas of end 9 and end 10 of piston 2. In order to build a regulator which would maintain one-half as much pressure in chamber 12 as in chamber 11 one would utilize the following equation:

$$\frac{A_1 - A_3}{A_2 - A_3} = \frac{1}{2}$$

where $A_1$ = area of end 9 of piston 2;
$A_2$ = area of end 10 of piston 3; and
$A_3$ = area of connecting passageway; and where $$A_1 = \pi D_1^2/4$$
$$A_2 = \pi D_2^2/4$$

and $$A_3 = \pi D_3^2/4$$

where $D_1$, $D_2$, and $D_3$ are the diameters of the end 9, end 10 and connecting passageway 6, respectively.

From the above equation it can readily be seen that which will maintain any predetermined fraction of chamber 11 pressure in chamber 12 may be fabricated by properly selecting the areas of end 9, and end 10 and passageway 6. To build a regulator which would maintain pressure in chamber 12 at one-fourth of that in chamber 11, one would fabricate according to equation:

$$\frac{A_1 - A_3}{A_2 - A_3} = \frac{1}{4}$$

Likewise if one wished to maintain pressure in chamber 12 at three-fourths of that in chamber 11 one would fabricate according to the equation:

$$\frac{A_1 - A_3}{A_2 - A_3} = \frac{3}{4}$$

It can be easily be seen from the foregoing that pressure regulators allowing a wide range of fractions of applied pressures to be passed could be fabricated by properly selecting the areas of the ends of the piston and the cross-sectional area of the connecting orifice to satisfy the equation:

$$\frac{A_1 - A_3}{A_2 - A_3} = \frac{x}{y}$$

where x is any number and y is any other number greater than x.

I claim: 1. A pressure regulator comprising, in combination:
a. a body having a cylindrical interior formed therein said interior having a wall with closed ends and a portion of said interior having a smaller diameter than a adjacent portion;
b. a cylindrical piston having a end faces positioned within said cylindrical interior, one portion of said piston having a smaller diameter than an adjacent portion, and said portions having axial lengths such that said piston can move freely in said cylindrical interior;
c. chambers formed between said end faces of said piston and said closed ends of said cylindrical interior;
c. chambers formed between said end faces of said piston and said closed ends of said cylindrical interior;
d. a passageway formed in and extending through said piston and communicating said chambers with one another;
e. inlet means in said closed end of said interior having a smaller diameter;
f. outlet means in said closed end of said interior having a larger diameter;
g. sealing means attached to said closed end of said portion of said interior having a smaller diameter, said sealing means being offset from said inlet means and said sealing means being adapted to close said passageway when in contact therewith upon movement of said piston toward said closed end; and
h. means attached to said piston providing a seal between walls of said piston and said cylindrical interior.